United States Patent [19]

Chaveron et al.

[11] Patent Number: 5,824,357
[45] Date of Patent: Oct. 20, 1998

[54] PREPARATION OF MILK AND COFFEE COMPOSITION FOR BEVERAGE PREPARATION

[75] Inventors: Michel Chaveron, La Tour-de-Peilz; Jürg Schlaginhaufen, Ostermundigen; Heinz Wyss, Oberdiessbach, all of Switzerland

[73] Assignee: Nestec S.A., Vevey, Switzerland

[21] Appl. No.: 645,809

[22] Filed: May 14, 1996

Related U.S. Application Data

[63] Continuation of Ser. No. 404,309, Mar. 10, 1995, Pat. No. 5,620,733.

[30] Foreign Application Priority Data

Apr. 2, 1994 [EP] European Pat. Off. .............. 94105214

[51] Int. Cl.⁶ ................................ A23C 9/156; A23F 5/00
[52] U.S. Cl. ........................ 426/580; 426/584; 426/588; 426/594
[58] Field of Search .................................. 426/580, 587, 426/594, 588, 584

[56] References Cited

U.S. PATENT DOCUMENTS

| | | |
|---|---|---|
| 2,398,081 | 7/1946 | Carter . |
| 2,564,332 | 8/1951 | Kellogg . |
| 3,653,911 | 4/1972 | Mancuso et al. . |
| 4,550,028 | 10/1985 | Montiony ................................. 426/582 |
| 4,748,040 | 5/1988 | Kuypers . |
| 5,223,299 | 6/1993 | Dalan et al. . |
| 5,620,733 | 4/1997 | Chaveron et al. ....................... 426/580 |

FOREIGN PATENT DOCUMENTS

| | | |
|---|---|---|
| 0406621 A2 | 2/1991 | European Pat. Off. . |
| 0406621 A3 | 2/1991 | European Pat. Off. . |

OTHER PUBLICATIONS

Derwent Publications Ltd., European Patent Abstracts, week 9102 EP(A)N, Abstract of European Patent Application Publication No. 0406 621–A (Feb. 91).

FSTA Database, International Food Information Service, Accession No. 82–05–p0684, abstract of Pawlik et al. "Selection of Factors preventing protein coagulation in dried milk products when dissolved in hot water" 1981.

Primary Examiner—Anthony J. Weier
Attorney, Agent, or Firm—Vogt & O'Donnell LLP

[57] ABSTRACT

In order to prepare a beverage composition of the instant white coffee type, milk or a milk derivative is heat treated in order to control the flocculation of the proteins and is mixed with a coffee extract by wet methods before the mixture is dried by spray drying.

15 Claims, No Drawings

PREPARATION OF MILK AND COFFEE COMPOSITION FOR BEVERAGE PREPARATION

CROSS-REFERENCE TO RELATED APPLICATION

This application is a continuation application of application Ser. No. 08/404,309, filed Mar. 10, 1995, now U.S. Pat. No. 5,620,733.

BACKGROUND OF THE INVENTION

The present invention relates to a method of production of an instant beverage composition of the white coffee or coffee substitute type.

Instant beverages of the white coffee or coffee substitute type may be produced by dry mixing of a basic powder, generally a coffee extract and a soluble coffee or coffee substitute powder. Soluble coffee or substitute may have been added to the liquid extract concentrate before final drying. During the preparation of the basic powder, stabilising salts are added to the milk to be preheated and then sterilised by UHT, in order to prevent the flocculation of the proteins both during the preparation of the powder and during the reconstitution of the beverage in the presence of coffee.

Dry mixing has a number of drawbacks. It is difficult to mix the powders in a completely homogeneous way. On reconstitution, moreover, the powder mixture does not always dissolve to provide a beverage whose appearance is completely homogeneous. There is also a loss of aromas.

It has been proposed, for instance in U.S. Pat. No. 2,398,081, to mix the coffee and milk by wet methods in the form of concentrates that are then dried to provide a homogeneous powder. This method makes it possible to avoid the additional stage of dry mixing. It has come up, however, against problems in the sense that it has not been possible completely to eliminate a visible flocculation of the proteins when the beverage is reconstituted with hot water.

SUMMARY OF THE INVENTION

The object of the invention is to produce an instant white coffee or coffee substitute which dissolves better and has organoleptic properties better than known instant white coffees or coffee substitutes when reconstituted with hot or boiling water.

The invention therefore relates to a method of production of a beverage composition of the white coffee or coffee substitute type, in which milk or a milk derivative in concentrated form is mixed by wet methods with a coffee or coffee substitute and in which the mixture is dried by spray drying, characterised in that the milk or the derivative is heat treated before and after concentration in order to carry out a controlled flocculation of the proteins.

DETAILED DESCRIPTION OF THE INVENTION

In the remainder of this description and in the claims, the term coffee is used to mean actual coffee or a coffee substitute such as chicory, for instance, or even a mixture of these products.

The term "milk" is used to mean milk itself, whether whole or skimmed to some extent, natural or reconstituted from powder. The term "milk derivative" is used to mean a cream or coffee whitening agent comprising, for instance, lactic proteins, lactose and, where appropriate, a vegetable fat.

In order to implement the method, in the case of whole milk, the milk is standardised, where necessary, i.e., the respective quantities by weight of fatty matter and non-fatty solids are adjusted to the desired values by the addition, according to need, for instance of skimmed milk, cream or butter oil. In the case of a derivative, the quantities of proteins, for instance of casein and whey proteins, demineralised where necessary, and lactose are adjusted. The quantity of lactic or vegetable fatty matter, previously melted where appropriate, is adjusted preferably after preheating of the mixture to 50°–80° C.

Once standardisation is complete, the mixture is heat treated at 90°–120° C. for 1 to 1200 seconds by direct heating, for instance by direct injection of vapour, or indirectly by means of a tube or plate heat-exchanger, where necessary combined with a standby tube. This is the first heat treatment. The direct injection of vapour at 95°–115° C. for 5–20 seconds, followed by an expansion on input into an evaporator is preferred. The liquid is then concentrated in a single or preferably multiple effect falling-flow evaporator to a dry matter content of 40–55% by weight.

After concentration, the concentrate may be cooled, for instance to 15°–20° C., and stored, where necessary, in a tank while awaiting subsequent processing.

At this stage, it is necessary to monitor the pH and free calcium content. A controlled flocculation of the whey proteins can be carried out correctly only if, prior to the subsequent heat treatment, the pH is between 5.8 and 6.3 and the free calcium content is between 3 and 5 mmoles/l. It is therefore necessary, where appropriate, to acidify the solution by means of a food acid, for instance lactic, phosphoric or citric acid. If necessary, calcium may be added, for instance in the form of calcium chloride. The concentrate, preferably with a pH of 6.1–6.4, typically approximately 6.25, is heat treated in a similar manner to the previous heat treatment, preferably by direct injection of vapour at 90°–125° C. for 5–20 seconds, for instance at approximately 105° C. for approximately 10 seconds. This treatment of the concentrate, or second heat treatment, causes a controlled flocculation of the whey proteins whose purpose is to prevent a subsequent perceptible flocculation of these proteins when the beverage is reconstituted.

After cooling, for instance by expansion at approximately 70°–80° C., a liquid coffee extract, for instance, representing up to 25% by weight of the final product in terms of dry matter is added to the lactic concentrate. This addition may take place in a tank, by charging or preferably directly on line and may take place in one or several stages and if necessary, in progressive quantities.

According to a first variant of the addition of coffee, which is preferred, a coffee concentrate is preheated to the same temperature as the lactic concentrate, they are mixed and the mixture is then subjected to the second heat treatment as defined above.

According to a second variant of the addition of coffee, the latter is divided into two portions, one being added prior to the second heat treatment and the other forming the supplement after the second heat treatment.

After the addition of coffee, the pH is 5.8–6.3 depending on the quantity of coffee added. The mixture may be homogenised, in one or two stages, for instance at 20–200 bar, and preferably in two stages, for instance at approximately 110 bar at the first stage and approximately 50 bar at the second stage. This operation is optional, although preferred.

Optionally, an inert gas under low pressure may also be injected into the concentrate in order to lighten the structure of the powder so that it can subsequently be more readily dissolved.

Drying takes place by spray drying, at a pressure of 20–300 bar, preferably at approximately 80 bar, in a tower in a current of hot air.

After drying, the fine powder is preferably agglomerated, for instance in the presence of a solution of lecithin or lactose in order to improve the wettability of the final powder, this stage being a preferred option.

It will be appreciated that the addition of coffee by wet methods may be partial, the remainder of the soluble coffee then being dry mixed with the powder from the drying tower.

EXAMPLES

The invention is illustrated by the following examples. In these examples, parts and percentages are by weight unless otherwise specified.

Example 1

4140 kg of skimmed milk were mixed with 287 kg of a 50% demineralised whey powder, whose (%) composition was as follows:

| | | |
|---|---|---|
| Protein | 11–12 | |
| Lactose | 78 | |
| Fat | 1.5 | |
| Ash | 4 | |
| Water | 4 | |

After dissolution, the solution was preheated to 73° C. in a plate heat exchanger and 216 kg of hydrogenated coconut fat which had previously been melted was added. These raw materials were mixed, then conveyed to a UHT sterilisation apparatus where the mixture was treated at 115° C. for 10 seconds by direct injection of vapour, then introduced into a falling-flow evaporator where it was subject to an expansion and concentrated to 50% of dry matter. After preheating to 73° C. in a plate exchanger, 70 kg of a 45% concentrated solution of coffee, prepared by dissolving soluble coffee in water, was added to the concentrate, the pH being 5.9, after which the mixture was placed in a UHT sterilisation device with direct injection of vapour where it was subject to a second heat treatment at 105° C. for 10 seconds. The concentrate was then dried in a drying tower by spray drying at a pressure of 60 bar and at 75° C. at nozzle level. 126 kg of fine coffee powder as well as the fines separated from the drying air in a cyclone associated with the drying tower and returned to the tower were lastly added to the powder obtained.

The final powder had the composition given in Table 1 below:

TABLE 1

| Components | % Composition |
|---|---|
| Proteins | 16.2 |
| from skimmed milk | 13 |
| from whey | 3.2 |
| Vegetable fat | 21.2 |
| Lactose | 38.8 |
| from skimmed milk | 19.2 |
| from whey | 19.6 |
| Coffee | 15 |
| Minerals | 6.2 |
| Water | 2.6 |

The powder had a homogeneous appearance. When redissolved, even in boiling water, the beverage showed no perceptible flocculation of the milk proteins and had a clear coffee flavour.

Example 2

The method of Example 1 was used, except that the concentrated solution of coffee was introduced at 20° C. into the concentrate after heat treating it a second time, then cooled to 20° C. The concentrated mixture of milk and coffee is preheated, and drying of the mixture took place as described in Example 1.

The powder had a homogeneous appearance. When redissolved, even in boiling water, the beverage showed no perceptible flocculation of the milk proteins and had a clear coffee flavour.

Example 3

The method of Example 2 was used, except that after preheating of the concentrated mixture of milk and coffee, homogenisation took place in two stages, at 110 bar at the first stage then at 50 bar at the second stage, before it was dried.

The powder had a homogeneous appearance. When redissolved, even in boiling water, the beverage showed no perceptible flocculation of the milk proteins and had a clear coffee flavour.

Example 4

The method of Example 1 was used, except that after preheating of the concentrated mixture of milk and coffee, homogenisation took place in two stages, at 110 bar at the first stage then at 50 bar at the second stage, before it was dried.

The powder had a homogeneous appearance. When redissolved, even in boiling water, the beverage showed no perceptible flocculation of the milk proteins and had a clear coffee flavour.

Example 5

The method of Example 1 was used, except that the second UHT heat treatment of the mixture of milk and coffee concentrates took place at 115° C. for 5 seconds.

The powder had a homogeneous appearance. When redissolved, even in boiling water, the beverage showed no perceptible flocculation of the milk proteins and had a clear coffee flavour.

Example 6

The method of Example 4 was used, except that the second UHT heat treatment of the mixture of milk and coffee concentrates took place at 115° C. for 5 seconds.

The powder had a homogeneous appearance. When redissolved, even in boiling water, the beverage showed no perceptible flocculation of the milk proteins and had a clear coffee flavour.

Example 7

0.35% of sodium hydrogen phosphate was added to the mixture of skimmed milk and whey proteins before the addition of melted coconut fat. The following operations were as described in Example 1, except that all the coffee was added to the line between the first preheating and drying, i.e., without dry mixing of the remaining coffee powder.

The powder had a homogeneous appearance. When redissolved, even in boiling water, the beverage showed no perceptible flocculation of the milk proteins and had a clear coffee flavour.

Example 8

The method of Example 2 was used, except that after preheating of the concentrated mixture of milk and coffee, it was homogenised in two stages, at 200 bar at the first stage then at 50 bar at the second stage, and the whole of the coffee was added to the line prior to homogenisation and drying, i.e., without dry mixing of the remaining coffee powder.

The powder had a homogeneous appearance. When redissolved, even in boiling water, the beverage showed no perceptible flocculation of the milk proteins and had a clear coffee flavour.

Example 9

The method of Example 2 was used, except that the first UHT heat treatment took place at 105° C. for 10 seconds, the second heat treatment took place at 115° C. for 10 seconds and the spray pressure at the nozzle was 250 bar.

The powder had a homogeneous appearance. When redissolved, even in boiling water, the beverage showed no perceptible flocculation of the milk proteins and had a clear coffee flavour.

Example 10

The method of Example 3 was used, except that the homogenisation took place at 50 bar at the first stage, then at 110 bar at the second stage and pressurised nitrogen was injected into the concentrated mixture of coffee and milk slightly before spray drying at the top of the drying tower.

When redissolved, even in boiling water, the beverage showed no perceptible flocculation of the milk proteins and had a clear coffee flavour.

Example 11

The method of Example 3 was used, except that nitrogen at a pressure of 7 bar was injected into the concentrated mixture of coffee and milk whose pressure was 6 bar, just before a high pressure pump which took up the gasified mixture and supplied it to a spray nozzle at the top of the drying tower, and a 50% aqueous solution of lactose at 80° C. was sprayed onto the powder in the drying tower in order to obtain a final concentration of lactose of 0.3% in the final product.

The gasification provided the powder with a specific weight of approximately 280 g/l with a nitrogen injection flow of 1 l/min and a flow of concentrate with 52% of dry matter of 510 l/h.

When redissolved, even in boiling water, the beverage showed no perceptible flocculation of the milk proteins and had a clear coffee flavour.

Example 12

The method of Example 1 as above was used, except that the coffee was replaced by a mixture of coffee and chicory in equal weights.

Example 13

The method of Example 1 as above was used, except that the demineralised whey powder, after reconstitution in water, was subject to a preliminary treatment to pre-denature the whey proteins as follows:

287 kg of demineralised whey powder was diluted to 50% in 1100 l of water, then the pH of the mass was adjusted to 5.9 by means of lactic acid. It was then ensured in a known manner by means of a specific electrode that the free calcium content was between 3 and 5 mmoles/l. If the value was lower than 3 mmoles/l, it was supplemented by adding calcium chloride. The whey mass was then heated by direct injection of vapour at 105° C. with a standby time of 15 seconds. The demineralised whey treated in this way was then mixed with 4140 kg of skimmed milk, then the mixture was subject to the operations described in Example 1.

We claim:

1. In a process for preparing a product for preparation of a beverage wherein a lactic concentrate is prepared from a milk product comprising a substance selected from the group consisting of a milk and a milk derivative and combinations thereof and by heat treating and concentrating the milk product to obtain the lactic concentrate and wherein the lactic concentrate is heat treated and then spray dried, the improvements comprising:

preparing the lactic concentrate so that the lactic concentrate has a pH between 5.8 and 6.3 and heat treating the lactic concentrate to flocculate whey protein to obtain a heat-treated concentrate containing flocculated whey protein;

adding a liquid coffee extract to the heat-treated concentrate to obtain a mixture;

spray drying the mixture to obtain a spray-dried product.

2. A process according to claim 1 wherein the milk product comprises a solution of whey proteins.

3. A process according to claim 2 wherein the whey proteins are demineralized whey proteins.

4. A process according to claim 2 or 3 further comprising, prior to heat treating the milk product, heating the solution of whey proteins to denature the whey proteins so that the solution contains denatured whey proteins.

5. A process according to claim 4 further comprising adding milk to the solution containing the denatured whey proteins to obtain the milk product for heat treating.

6. A process according to claim 1 wherein prior to heat treating the lactic concentrate, an acid is added to the lactic concentrate to obtain the lactic concentrate having a pH between 5.8 and 6.3.

7. A process according to claim 1 or 2 or 3 further comprising preparing the lactic concentrate so that the lactic concentrate has a free calcium content of between 3 mmoles and 5 mmoles.

8. A process according to claim 2 or 3 further comprising adding calcium and an acid to the solution so that during heat treating, the lactic concentrate has a free calcium content of between 3 mmoles and 5 mmoles and has the pH of between 5.8 and 6.3.

9. A process according to claim 1 further comprising, prior to spray drying the mixture, homogenizing the mixture.

10. A process according to claim 9 wherein the mixture is homogenized in two stages under a pressure of from 20 bar to 200 bar.

11. A process according to claim 1 further comprising adding soluble coffee to the spray-dried product to obtain a second product.

12. A process according to claim 11 wherein the liquid coffee extract is added to the heat-treated concentrate in an amount so that upon obtaining the second product, the extract added has a dry matter content in an amount of up to 25% by weight dry matter of the second product.

13. A process according to claim 2 wherein the lactic concentrate is heat treated at a temperature of from 95° C. to 115° C. for from 5 seconds to 20 seconds.

14. A process according to claim 13 wherein the milk product is heat treated at a temperature of from 90° C. to 120° C. for from 1 second to 1200 seconds.

15. A process according to claim 1 further comprising introducing a gas into the mixture.

* * * * *